(12) United States Patent
Liang et al.

(10) Patent No.: US 8,755,312 B2
(45) Date of Patent: Jun. 17, 2014

(54) APPARATUS AND METHOD FOR SUPPORTING GATEWAY NODE RESELECTION IN COMMUNICATION SYSTEM

(75) Inventors: Huarui Liang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 13/092,335

(22) Filed: Apr. 22, 2011

(65) Prior Publication Data

US 2011/0268086 A1    Nov. 3, 2011

(30) Foreign Application Priority Data

Apr. 30, 2010 (CN) .......................... 2010 1 0162474

(51) Int. Cl.
*H04B 7/00* (2006.01)
(52) U.S. Cl.
USPC .......................................................... 370/310
(58) Field of Classification Search
CPC ............... H04W 36/0005; H04W 36/0016; H04W 36/0055; H04W 36/0072; H04W 36/0077
USPC .......... 370/310, 328, 329, 331, 431; 709/223, 709/238, 249
See application file for complete search history.

(56) References Cited

U.S. PATENT DOCUMENTS

| | | | | |
|---|---|---|---|---|
| 8,200,224 | B2 * | 6/2012 | Grob-Lipski et al. | 455/436 |
| 8,254,294 | B2 * | 8/2012 | Vesterinen | 370/259 |
| 8,289,927 | B2 * | 10/2012 | Grob-Lipski et al. | 370/331 |
| 2008/0062943 | A1 * | 3/2008 | Lin | 370/342 |
| 2008/0285492 | A1 | 11/2008 | Vesterinen | |
| 2010/0056147 | A1 * | 3/2010 | Sun et al. | 455/435.2 |
| 2010/0091734 | A1 * | 4/2010 | Park et al. | 370/331 |
| 2011/0116477 | A1 * | 5/2011 | Wu | 370/331 |
| 2011/0171915 | A1 * | 7/2011 | Gomes et al. | 455/73 |
| 2011/0274087 | A1 * | 11/2011 | Liang et al. | 370/331 |

FOREIGN PATENT DOCUMENTS

WO       2009/084864 A1    7/2009

OTHER PUBLICATIONS

3GPP 23.829 V1.0.1 (Mar. 2010), LOcal IP Access and Selected IP Traffic Offload, 3GPP, Mar. 2010, pp. 1-37.*
3GPP TS 23.401 V9.4.0 (Mar. 2010), GPRS enhancements for E-UTRAN access, 3GPP, Mar. 2010, pp. 1-140.*
3GPP TS 23.401 V9.4.0 (Mar. 2010), GPRS enhancements for E-UTRAN access, 3GPP, Mar. 2010, pp. 141-258.*

* cited by examiner

*Primary Examiner* — Dmitry H Levitan
(74) *Attorney, Agent, or Firm* — Jefferson IP Law, LLP

(57) ABSTRACT

An apparatus and a method for supporting gateway node reselection in a communication system during a process in which a UE hands over from a source base station to a destination base station are provided. The apparatus includes the source base station for providing the destination base station with information for access control determination, the destination base station for making an access control determination according to the information provided by the source base station, the UE or a network for initiating a gateway reselection process according to the result of the access control determination. With the method, the reselection of Packet Data Network Gateway (PDN GW) or GGSN is implemented in a simple and reliable way by optimizing the existing signaling processes, in the case of user plane node reselection because UE changes position or handover to another base station.

14 Claims, 10 Drawing Sheets

APPARATUS AND METHOD FOR SUPPORTING GATEWAY NODE RESELECTION IN COMMUNICATION SYSTEM

PRIORITY

This application claims the benefit under 35 U.S.C. §119 (a) of a Chinese patent application filed on Apr. 30, 2010 in the Chinese Intellectual Property Office and assigned Serial No. 201010162474.8, the entire disclosure of which is hereby incorporated by reference.

BACKGROUND OF THE INVENTION

1. Field of the Invention

The present invention relates to the field of mobile communication technologies. More particularly, the present invention relates to an apparatus and a method for supporting gateway node reselection in a communication system.

2. Description of the Related Art

FIG. 1 is a schematic diagram illustrating the structure of a Long Term Evolution (LTE) system in the prior art.

Referring to FIG. 1, a System Architecture Evolution (SAE) includes a User Equipment (UE) 101 which is a terminal device for receiving data. An Evolved-Universal Terrestrial Radio Access Network (E-UTRAN) 102 is a radio access network, which includes a macro base station (e.g., an evolved Node B (eNB)) providing the UE with an access radio network interface. A Mobile Management Entity (MME) 103 is responsible for managing mobile context, session context, and security information for the UE. A Service Gateway (SGW) 104 mainly provides the function of the user plane. In practical networks, the MME 103 and the SGW 104 may be located at the same physical entity. A Packet Data Network Gateway (PDN GW) 105 is responsible for the functions of charging, legal listening, and so on, which may be located at the same physical entity as the SGW 104. A Policy and Charging Rule Function (PCRF) 106 provides Quality of Service (QoS) policies and charging rules. A General Packet Radio Service Supporting Node (SGSN) 108 is a network node device providing routes for data transmission in a Universal Mobile Telecommunication System (UMTS). A Home Subscriber Server (HSS) 109 is a home subsystem of the UE, responsible for saving subscriber information including the current location of the UE, the address of the serving node, subscriber security information, packet data context of the UE, and so on.

With the increase in UE service data rate, operators provide a new technology of Selected IP Traffic Offload (SIPTO), in which in the process of the movement of a UE that has accessed a certain service, the network side can handover the UE automatically to a near radio network access point, which reduces the costs invested for the transmission network and provides a better experience for the high data rate. The current 3$^{rd}$ Generation Partnership Project (3GPP) standard has proposed that the network needs to support the abilities of SIPTO and Local IP Access (LIPA). In SIPTO, the UE accesses the Internet and other external networks through a Home evolved Node B (HeNB), a Home Node B (HNB), or an eNB. When the UE accesses the network, the network side selects a suitable user plane node for the UE. In LIPA, on the other hand, the UE accesses a home network and an intranet through an HeNB or an HNB. In the implementation of LIPA, the network side also needs to select a suitable user plane node for the UE. The user plane node may be a user plane network device or a user plane gateway. The suitable user plane node usually refers to a user plane network device or a user plane gateway near to the UE. For an SAE system, the user plane node is an SGW or a PDN GW. And for a UMTS system, the user plane node is an SGSN or a Gateway General Packet Radio Services (GPRS) Supporting Node (GGSN).

FIG. 2 is a schematic diagram illustrating an application scenario in which a network reselects a user plane node for a UE in order to allocate its resources in an optimized way in the prior art.

Referring to FIG. 2, when the UE changes position, when a UE handover to another base station, or when the operator updates the policies after the network has selected a suitable PDN GW or GGSN, it becomes possible that the network reselects another PDN GW or GGSN for the UE in order to allocate its resources in an optimized way. The current standards have not specified how to implement the process of reselection such that when the above situation occurs, the UE can not continue enjoying the data service normally, which impairs the user's experience.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for supporting gateway node reselection, which is capable of implementing reselection of a Packet Data Network Gateway (PDN GW) or a Gateway General Packet Radio Services (GPRS) Supporting Node (GGSN), in a communication system.

To attain the above aspects, the technical solutions of the present invention may be implemented in the following way.

In accordance with an aspect of the present invention, a method for supporting gateway node reselection during a process in which a User Equipment (UE) hands over from a source base station to a destination base station is provided. The method includes providing, by a source base station, the destination base station with information for access control determination, determining, by the destination base station, access control according to the information provided by the source base station, and initiating, by the UE or a network, a gateway reselection process according to the result of the access control determination.

The information for access control determination provided by the source base station may include information of a user plane gateway node near to the source base station, wherein the information of the user plane gateway node is an IP address or identifier of a PDN GW.

The information for access control determination may be contained in a handover request message sent from the source base station to the destination base station.

When determining that successful handover can not be ensured, the destination base station may determine that the handover fails and send a handover preparation failure message to the source base station.

The initiating of a gateway reselection process according to the result of the access control determination by the UE or the network may includes, upon receiving the handover preparation failure message, requesting, by the source base station, a core network node to initiate a PDN connection releasing process, after the completion of the PDN connection releasing process, initiating, by the UE, a PDN connection establishment request to a Mobile Management Entity (MME), and, upon receiving the PDN connection establishment request, reselecting, by the MME, a PDN GW for the UE according to subscription information of the UE and information of a currently accessed base station.

The method of requesting, by the source base station, a core network node to initiate a PDN connection releasing process upon receiving the handover preparation failure message may include sending, by the source base station, a request message to the MME requesting the MME to trigger the PDN connection releasing process according to the received handover preparation failure message, and sending, by the MME, a PDN connection releasing request message to the UE.

The method of requesting, by the source base station, a core network node to initiate a PDN connection releasing process upon receiving the handover preparation failure message may include upon receiving the handover preparation failure message, sending, by the source base station, a Radio Resource Connection (RRC) releasing message to the UE, and, upon receiving the RRC releasing message, instructing, by the UE, a Non-Access Stratum (NAS) layer to initiate the PDN connection releasing process.

The process of initiating, by the UE, a PDN connection establishment request to the MME after the completion of the PDN connection releasing process may include after the completion of the PDN connection releasing process, initiating, by the UE, a PDN connection establishment request to the MME as required by the service, or, after the completion of the PDN connection releasing process, initiating, by the UE, a PDN connection establishment request to the MME immediately.

In accordance with an aspect of the present invention, a method for supporting gateway node reselection is provided. The method includes initiating, by a Policy and Charging Rule Function (PCRF), an IP Connectivity Access Network (CAN) session modification process with new policy information carried therein to a PDN GW, sending, by the PDN GW, at least one of a bearer update request message and a newly-defined General Packet Radio Services (GPRS) Tunneling Protocol (GTP) message to a Serving Gateway (SGW) in response to the modification process, the bearer update request message or the newly-defined GTP message having the new policy information carried therein, forwarding, by the SGW, the bearer update request message or the newly-defined GTP message to an MME, and determining, by the MME, according to the new policy information, whether the MME needs to trigger a PDN GW reselection process, and if yes, reselecting a PDN GW for UE.

The method of determining, by the MME, according to the new policy information, whether the MME needs to trigger a PDN GW reselection process, and if yes, reselecting a PDN GW for UE may include determining, by the MME, according to the new policy information, whether it needs to trigger a PDN connection deactivation process, and if yes, sending a PDN connection deactivation request message to the UE, upon receiving the deactivation request message, reinitiating, by the UE, a PDN connection request with instruction information requesting PDN GW reselection carried therein, and reselecting, by the MME, a PDN GW for the UE according to the instruction information.

The method may further include sending, by the MME, updated subscription information to an HSS to update subscription information of the UE, including LIPA information corresponding to the Access Point Name (APN), which step is performed in a bearer modification process or the PDN GW reselection process triggered by the MME, returning, by the HSS, an update confirmation message to the MME after update the subscription information of the UE, and updating, by the MME, the stored subscription information of the UE.

As can be seen from the description, with the methods for supporting gateway node reselection according to exemplary embodiments of the present invention, the reselection of PDN GW or GGSN can be implemented in a simple and reliable way by optimizing the existing signaling processes, in the case of user plane node reselection because UE changes position or handover to another base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As described in the BACKGROUND OF THE INVENTION section, a network may reselect another Packet Data Network Gateway (PDN GW) or Gateway General Packet Radio Services (GPRS) Supporting Node (GGSN) for User Equipment (UE) in order to allocate its resources in an optimized way in a communication system, in the case that:

1) the UE changes position or handover to another base station; or 2) the operator updates the policies.

Exemplary methods for supporting gateway node reselection will be described in more detail with reference to the above two cases.

Figure 1:
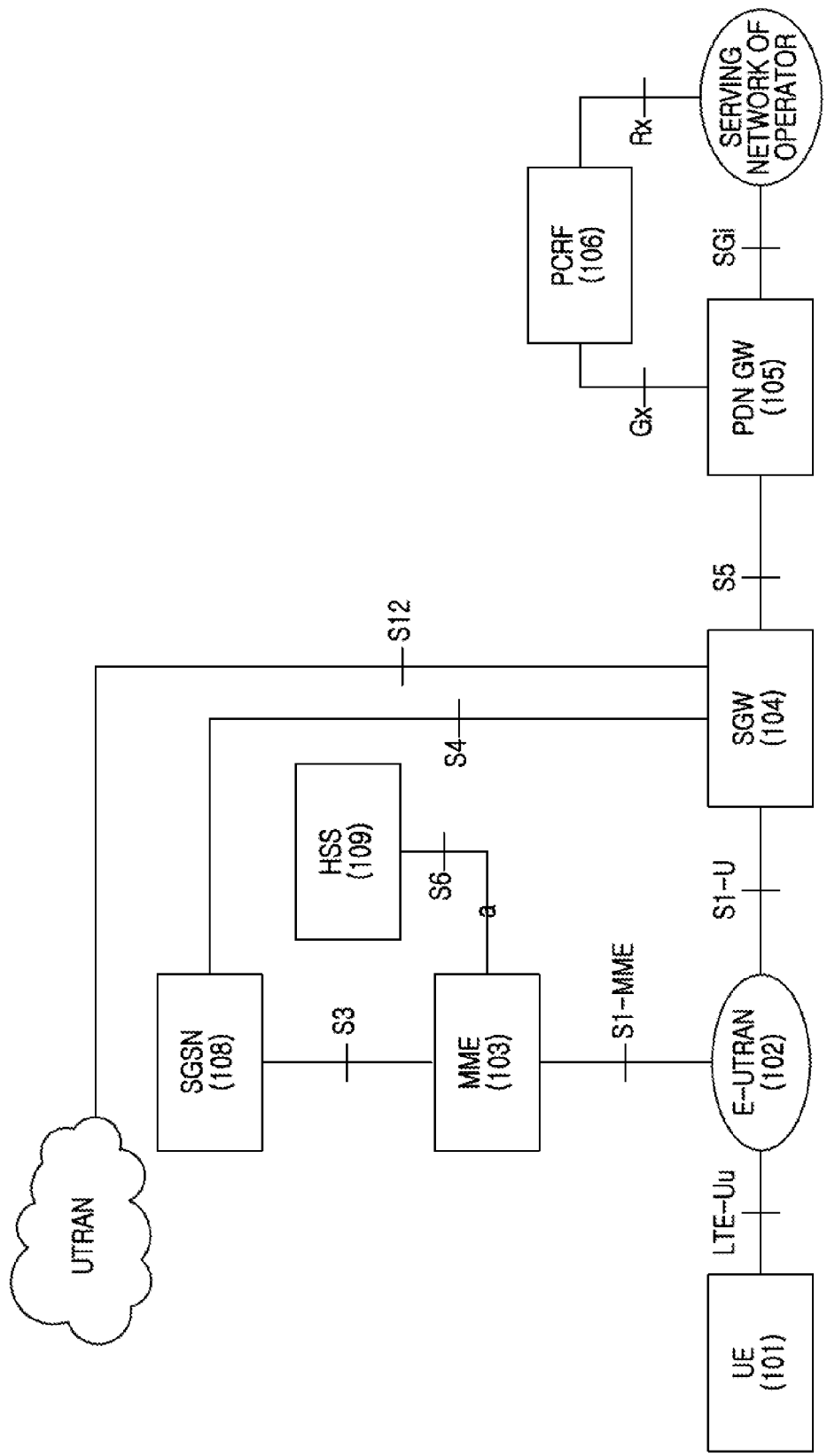
FIG. 1 is a schematic diagram illustrating the structure of a Long Term Evolution (LTE) system in the prior art.
Figure 2:
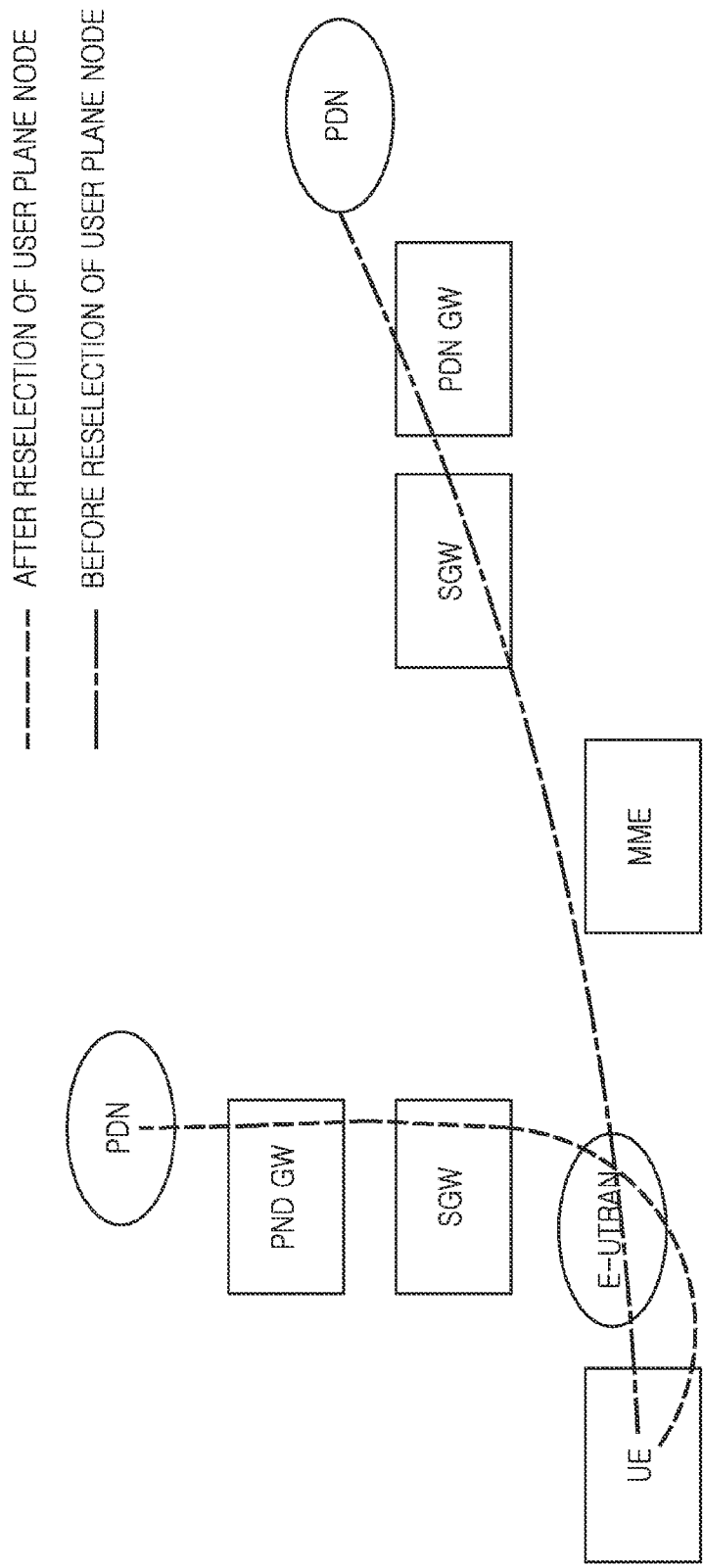
FIG. 2 is a schematic diagram illustrating an application scenario in which the network reselects a user plane node for a User Equipment (UE) in order to allocate its resources in an optimized way in the prior art.
Figure 3:
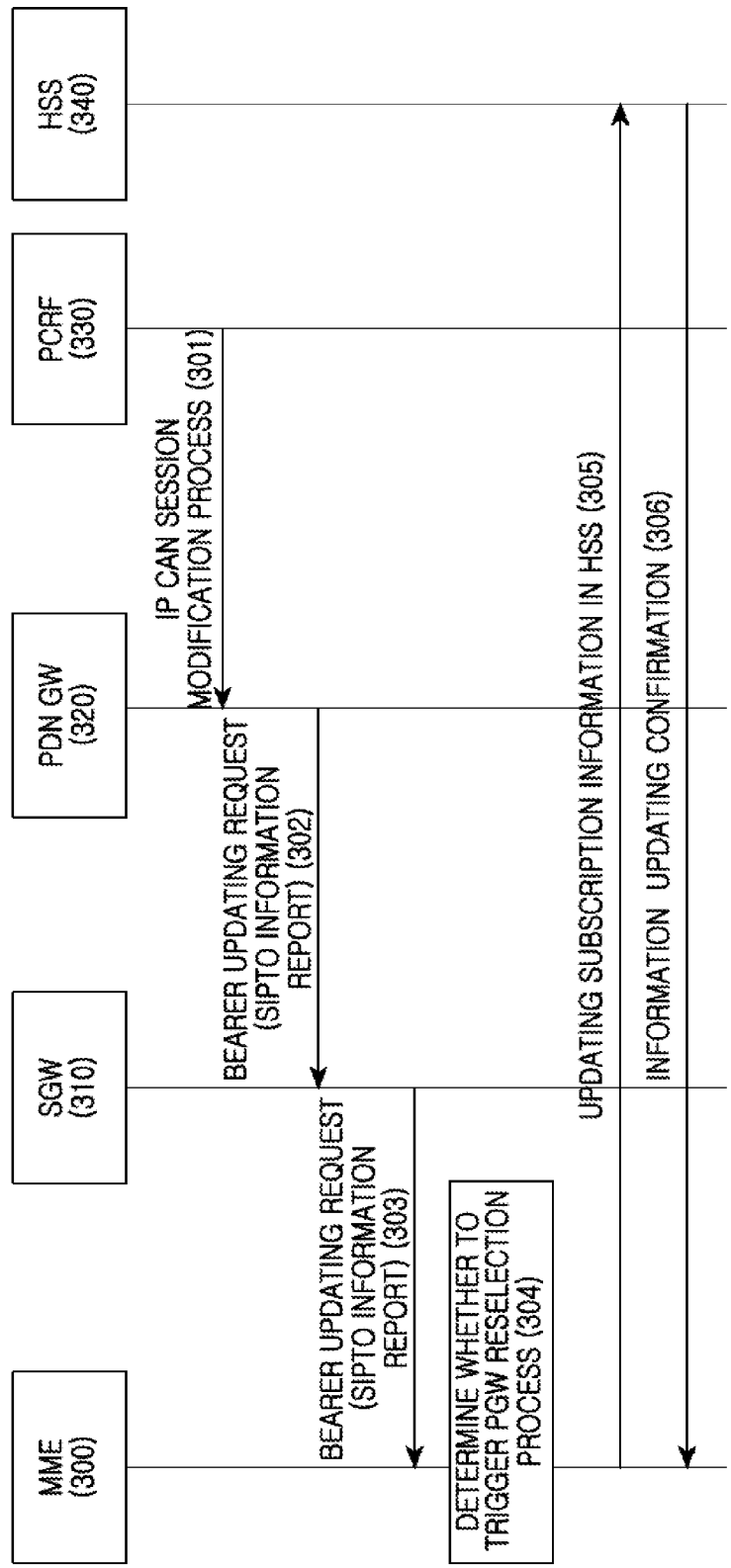
FIG. 3 is a schematic flowchart illustrating a method for supporting gateway node reselection in a communication system according to an exemplary embodiment of the present invention.

FIG. 3 is a schematic flowchart illustrating a method for supporting gateway node reselection in a communication system according to an exemplary embodiment of the present invention. In FIG. 3, a method for supporting gateway node reselection, applied to user plane node reselection because the operator updates the policies, is illustrated Referring to FIG. 3, the method includes:

Step 301: a Policy and Charging Rule Function (PCRF) 330 initiates an IP Connectivity Access Network (CAN) session modification process with new policy information carried therein to a PDN GW 320;

Step 302: the PDN GW 320 sends a bearer update request message or a newly-defined General Packet Radio Services (GPRS) Tunneling Protocol (GTP) message to an Service Gateway (SGW) 310 in response to the modification process, the bearer update request message or the newly-defined GTP message having the new policy information carried therein;

Step 303: the SGW 310 forwards the bearer update request message or the newly-defined GTP message to a Mobile Management Entity (MME) 300;

Step 304: the MME 300 determines, according to the new policy information, whether it needs to trigger a PDN GW reselection process, and if yes, reselects another PDN GW 320 for UE.

In an exemplary implementation, step 304 may include:

Step 304-1: the MME 300 determines, according to the new policy information, whether it needs to trigger a PDN connection deactivation process, and if yes, sends a PDN connection deactivation request message to the UE;

Step 304-2: upon receiving the deactivation request message, the UE reinitiates a PDN connection request with instruction information requesting PDN GW reselection carried therein;

Step 304-3: the MME 300 reselects a PDN GW 320 for the UE according to the instruction information.

Further, the method may include the following steps:

Step 305: the MME 300 sends updated subscription information to a Home Subscriber Server (HSS) 340 to update subscription information of the UE, including Local IP Access (LIPA) information corresponding to the Access Point Name (APN). For example, the LIPA information corresponding to the APN indicates that it does not need to implement LIPA. The purpose of this is so that a next or subsequent time when the MME 300 receives a PDN connection request or another Non-Access Stratum (NAS) request message from the UE, the MME 300 selects, according to the LIPA information corresponding to the APN, another PDN GW 320, rather than selecting repeatedly the PDN GW 320 before the policy modification.

Step 305 may be performed in a bearer modification process or the PDN GW reselection process triggered by the MME 300 (i.e. the PDN connection deactivation process triggered by the MME 300). This step is optional. That is, if the MME 300 does not perform step 305, the MME 300 determines, when implementing the selection of PDN GW next time, the selection of PDN GW according to the updated policy information and the LIPA information corresponding to the APN collectively.

Step 306: after step 305 is performed, the HSS 340 returns an update confirmation message to the MME 300 after updating the subscription information of the UE successfully, and the MME 300 also updates the stored subscription information of the UE.

As can be seen, with the above exemplary method, when the operator updates the policy information, the PDN GW 320 sends a policy update notice to the SGW 310, which forwards the policy update notice to the MME 300, and the MME 300 becomes aware that the relevant policies have been changed, such that the MME 300 can determine, according to the new policy information, whether it needs to implement user plane node reselection and accomplish the reselection process. For example, although the MME 300 has originally determined that it needs to select a PDN GW nearer to a certain base station for the UE, according to the Selected IP Traffic Offload (SIPTO) identifier in the subscription information of the UE, when receiving the changed policy information through step 303, the MME 300 determines that it does not any longer need to select the nearer PDN GW for the UE, according to the new policy information, even if the subscription information of the UE contains the SIPTO identification information. The MME 300 may also choose to inform HSS, so that when the UE accesses the network again or again requests a PDN connection, the MME 300 may select a corresponding PDN GW for the UE directly according to the updated subscription information.

Figure 4:
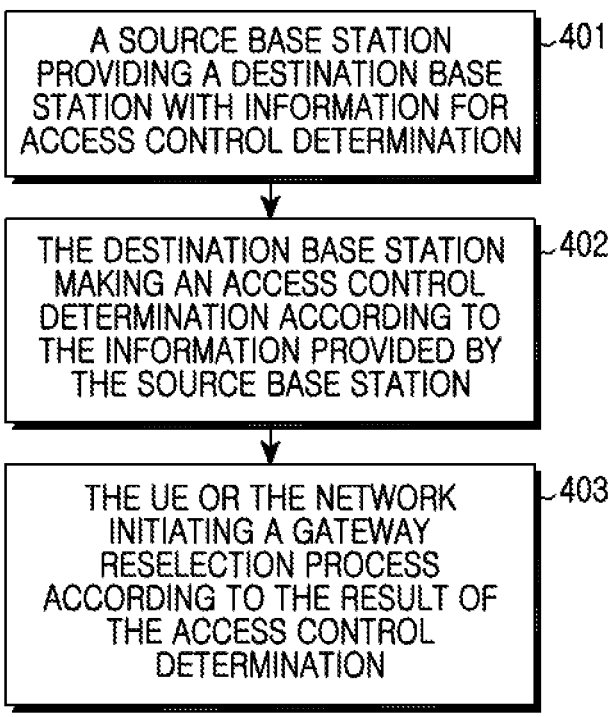
FIG. 4 is a schematic flowchart illustrating a method for supporting gateway node reselection in a communication system according to an exemplary embodiment of the present invention.

FIG. 4 is a schematic flowchart illustrating a method for supporting gateway node reselection in a communication system according to an exemplary embodiment of the present invention. In FIG. 4, a method for supporting gateway node reselection, applied to user plane node reselection because a UE changes position or hands over to another base station, is illustrated.

Referring to FIG. 4, the method includes:

Step 401: a source base station provides a destination base station (target base station) with information for access control determination;

Step 402: the destination base station makes an access control determination according to the information provided by the source base station;

Step 403: the UE or the network initiates a gateway reselection process according to the result of the access control determination.

Steps 401-403 will be described in more detail below with reference to specific implementations.

Figure 5:
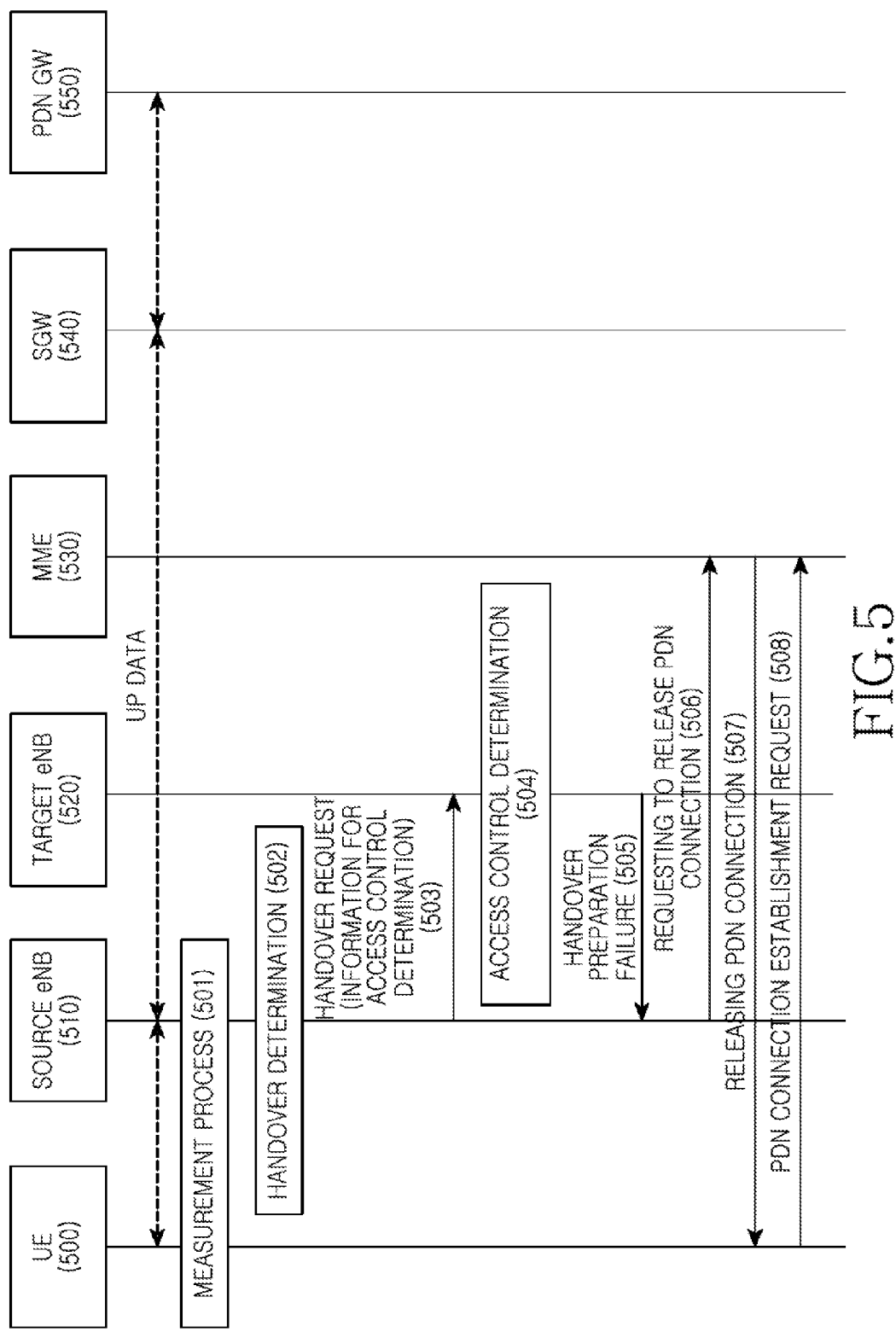
FIG. 5 is a schematic flowchart illustrating an implementation of a method for supporting gateway node reselection in a communication system according to an exemplary embodiment of the present invention.

FIG. 5 is a schematic flowchart illustrating an implementation of a method for supporting gateway node reselection in a communication system according to an exemplary embodiment of the present invention Referring to FIG. 5, an exemplary implementation includes the following steps.

Step 501: a handover measurement process is performed by a UE 500 and a source base station 510.

Step 502: the source base station 510 implements the handover according to a measurement report sent from the UE 500.

Step 503: the source base station 510 sends a handover request message to a destination base station 520, the handover request message containing the information for the access control determination by the destination base station 520, e.g. information of a PDN GW 550 near to the source base station 510, which may be an IP address or identifier of the PDN GW 550 near to the source base station 510, or information of an SGW 540.

Step 504: the destination base station 520 determines whether the handover can be continued, and if not, performs step 505; otherwise, the destination base station 520 implements the handover process according to a prior art solution, the details of which will not be described here.

Step 505: the destination base station 520 sends a handover preparation failure message to the source base station 510.

There are two exemplary methods of the procedure after step 505, depending on different handover preparation failure messages.

First, the source base station 510 cuts the radio connection of the UE 500 upon receiving the handover preparation failure message and afterwards, reinitiates a PDN connection establishment request to an MME 530 when the UE 500 requests a service. The flow thereof is the same as in the prior art and will not be detailed here.

Second, the handover preparation failure message sent in step 505 further contains information indicating the reason for the handover failure and step 506 is performed successively.

Step 506: the source base station 510 sends a request message requesting the MME 530 to trigger a PDN connection releasing process, according to the information indicating the reason for the handover failure contained in the received handover preparation failure message, the message being an S1-AP message.

Step 507: the MME 530 sends the PDN connection releasing request message to the UE 500.

Step 508: the UE 500 initiates a PDN connection establishment request to the MME 530 as required by the service, and, upon receiving the PDN connection establishment request, the MME 530 reselects a PDN GW 550 for the UE 500 according to subscription information of the UE 500 and information of a currently accessed base station.

In an exemplary implementation, the PDN connection releasing request message sent from the MME 530 to the UE 500 may further include instruction information requesting the UE 500 to initiate a PDN connection establishment request immediately. Accordingly, step 508 becomes initiating, by the UE 500, a PDN connection establishment request to the MME 530 immediately, and, upon receiving the PDN connection establishment request, reselecting, by the MME 530, a PDN GW 550 for the UE 500 according to subscription information of the UE 500 and information of a currently accessed base station.

Figure 6:
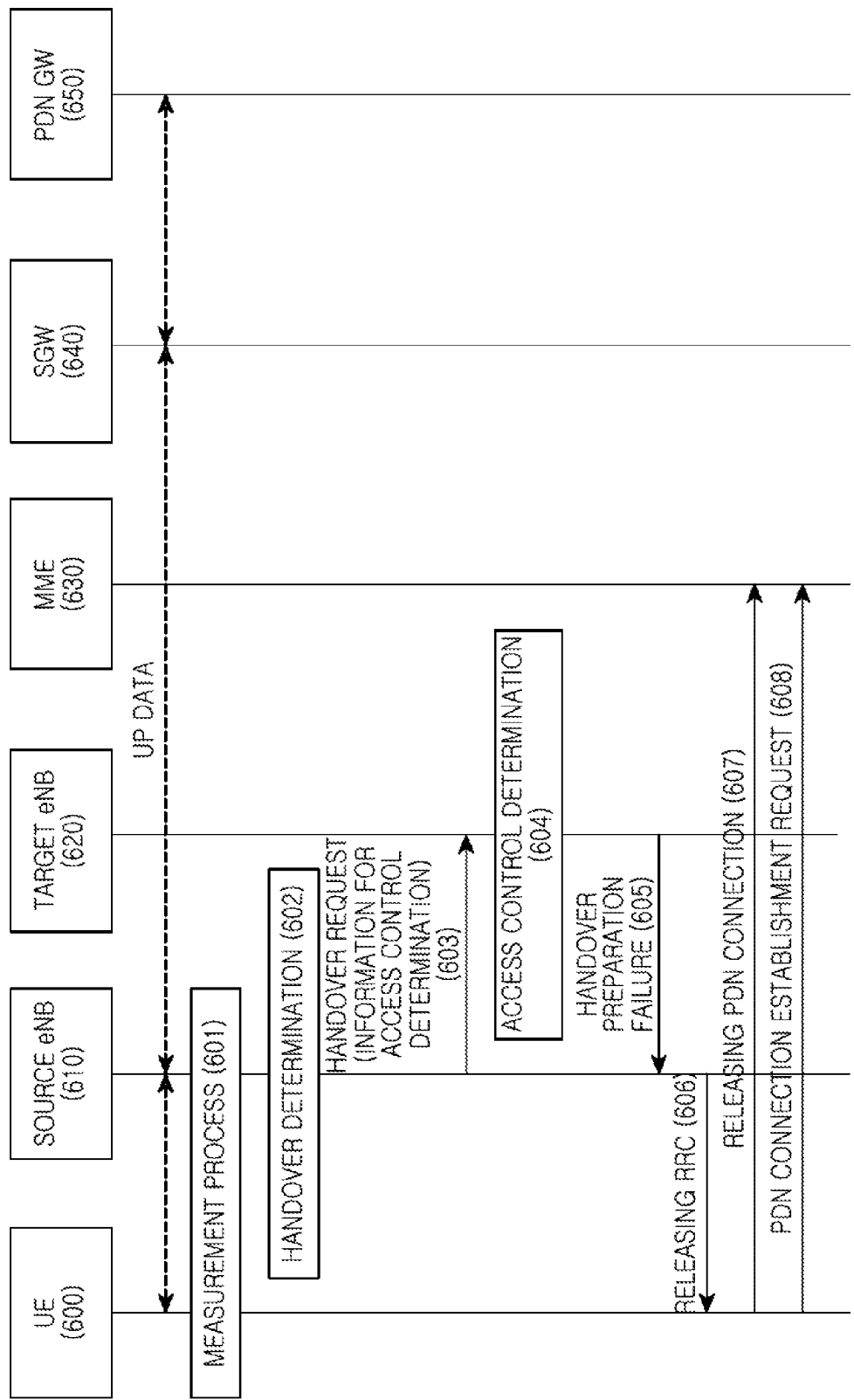
FIG. 6 is a schematic flowchart illustrating an implementation of a method for supporting gateway node reselection in a communication system according to an exemplary embodiment of the present invention.

FIG. 6 is a schematic flowchart illustrating an implementation of a method for supporting gateway node reselection in a communication system according to an exemplary embodiment of the present invention.

Alternatively, the flow of the other method for supporting gateway node reselection may be that shown in FIG. 6.

Referring to FIG. 6, steps 601-605 are the same as steps 501-505 and therefore their description as well as the description of each component 600-650, will not be provided again for sake of convenience.

Step 606: a source base station 610 sends a Radio Resource Connection (RRC) releasing message to a UE 600.

Step 607: upon receiving the RRC releasing message, the UE 600 instructs the NAS layer to initiate a PDN connection releasing process.

Step 608: after the completion of the PDN connection releasing process, the UE 600 initiates a PDN connection establishment request to an MME 630 as required by the service; or after the completion of the PDN connection releasing process, the UE 600 initiates a PDN connection establishment request to the MME 630 immediately.

Although not shown in FIG. 6, upon receiving the PDN connection establishment request, the MME 630 reselects a PDN GW 650 for the UE 600 according to subscription information of the UE 600 and information of a currently accessed base station.

In an exemplary implementation, the RRC releasing message in step 606 further contains information indicating the reason for the handover failure. Accordingly in step 607, the UE 600 receives the RRC releasing message and instructs the NAS layer to initiate a PDN connection releasing process according to the indicative information contained therein, and step 608 is performed afterwards.

When there are multiple PDN connections or bearers for UE, a situation may occur in which some bearers or the bearers on some PDN connections are switched successfully and some bearers are switched unsuccessfully. A corresponding implementation, as shown in FIG. 7.

Figure 7:
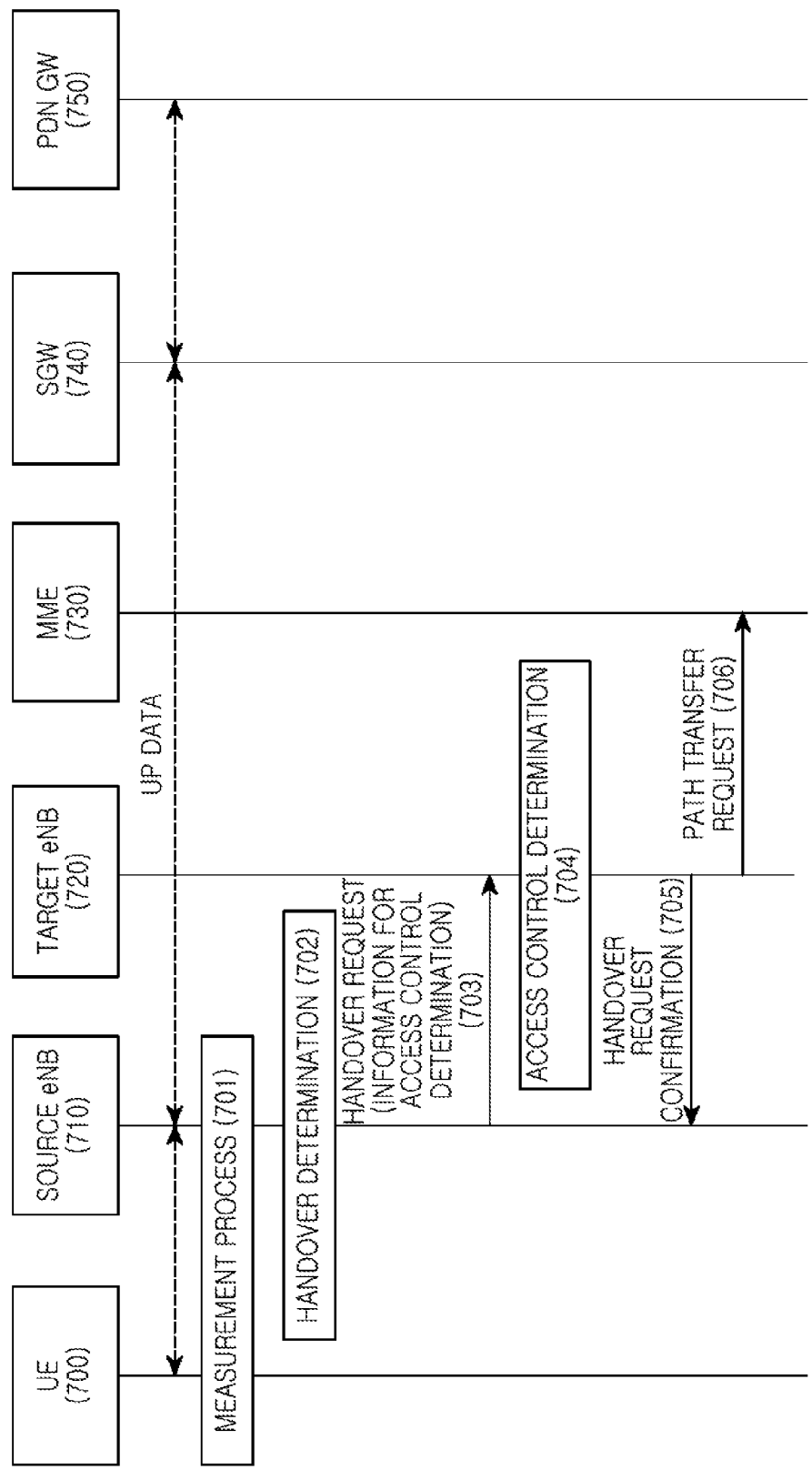
FIG. 7 is a schematic diagram illustrating an implementation for supporting gateway node reselection when there are multiple Packet Data Network (PDN) connections or bearers for a UE in a communication system, according to an exemplary embodiment of the present invention.

FIG. 7 is a schematic diagram illustrating an implementation for supporting gateway node reselection when there are multiple Packet Data Network (PDN) connections or bearers for a UE in a communication system, according to an exemplary embodiment of the present invention.

Referring to FIG. 7, steps 701-704 are the same as steps 501-504 in the above exemplary embodiment and therefore their description, as well as the description of each component 700-750, will not be provided again for sake of convenience.

Step 705: a destination base station 720 determines, according to the information for access control determination, that some PDN connections can not be switched successfully to the destination network. For example, if, according to the information of the user plane node, i.e. a PDN connection is based on LIPA or SIPTO, the destination base station 720 determines that the PDN connection can not continue keeping the service continuity in the destination network, then the destination base station 720 determines that the PDN connection should be put into a list of unsuccessful bearers. In the handover request confirmation message, the bearer information included in the PDN connection based on LIPA or SIPTO is put into a list of unsuccessful bearer information for notifying to a source base station 710.

Step 706: the destination base station 720 sends a path transfer request to an MME 730, the request message including unsuccessful bearer information, including bearer information included in the PDN connection based on LIPA. The MME 730 initiates a special bearer deactivation process or PDN connection deactivation process according to the information.

The deactivation message initiated by the MME 730 contains an indication requesting the UE 700 to initiate a PDN connection request process. The UE 700 initiates a PDN connection establishment request to the MME 730 according to the indication. The MME 730 reselects another PDN GW 750 for the UE 700 according to the subscription information of the UE 700, e.g. APN information and so on. Alternatively, after the deactivation process is initiated by the MME 730, the UE 700 initiates a PDN connection establishment process just when the UE 700 requests the service as required by the service.

Alternatively, in the case of S1 HO, when there are multiple PDN connections or bearers for UE, a situation may also occur in which some bearers or the bearers on some PDN connections are switched successfully and some bearers are switched unsuccessfully.

Figure 8:
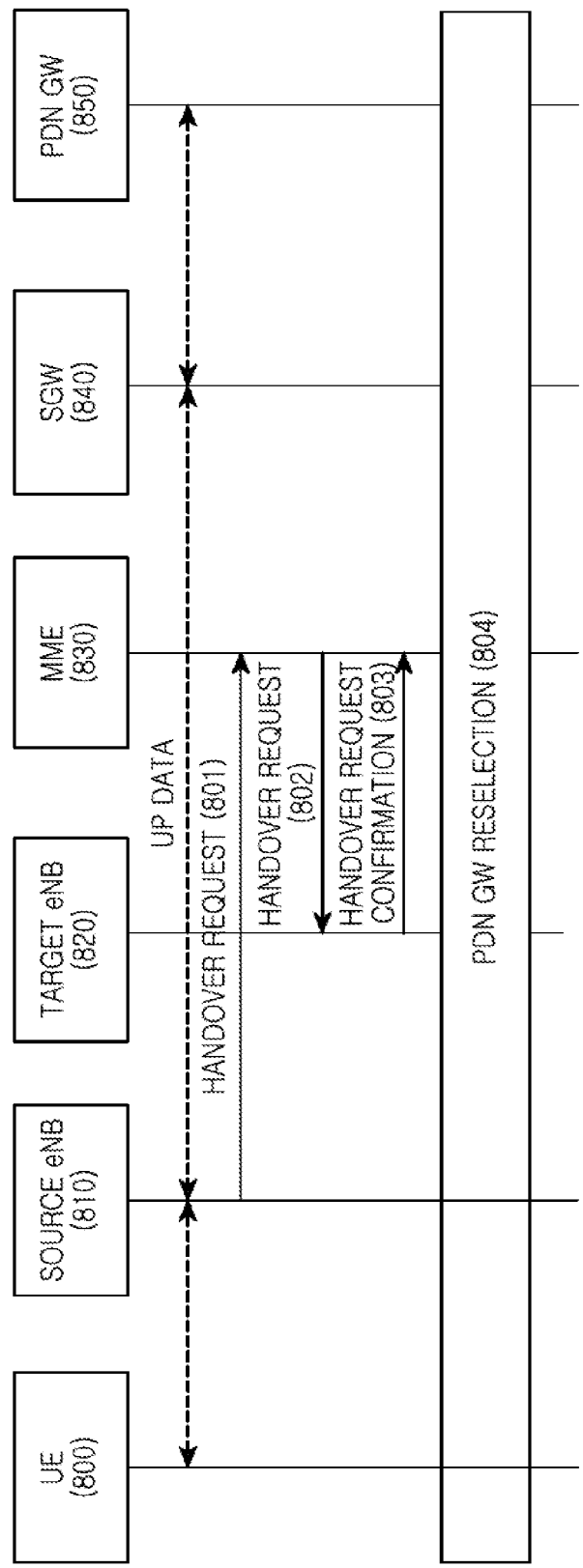
FIG. 8 is a schematic diagram illustrating an implementation for supporting gateway node reselection when there are multiple PDN connections or bearers for a UE in the case of S1 Handover (HO) in a communication system, according to an exemplary embodiment of the present invention.

FIG. 8 is a schematic diagram illustrating an implementation for supporting gateway node reselection when there are multiple PDN connections or bearers for a UE in the case of S1 Handover (HO) in a communication system, according to an exemplary embodiment of the present invention.

Referring to FIG. 8, a corresponding implementation includes the following steps.

Step 801: the source base station 810 sends a handover request message to the MME 830.

The MME 830 makes an access control determination according to ID information or location region information of the destination base station 820 contained in the message, and the information for access control determination requested from the destination base station 820, e.g. information of a PDN GW 850 near to the destination base station 820; or information of the user plane near to the destination base station 820 obtained through a node such as Operation And Management (OAM) or information of the user plane near to the destination base station 820 stored in advance.

If the bearer of a PDN connection related to LIPA or SIPTO can not ensure the service continuity, the handover request message in step 802 has only a list of successful bearers carried therein, and does not include unsuccessful bearer information related to LIPA or SIPTO. Alternatively, the handover request message in step 802 has successful bearer information and unsuccessful bearer information carried therein.

Step 803: the destination base station 820 sends a handover request confirmation message to the MME 830.

Step 804: the MME 830 initiates a special bearer deactivation process or PDN connection deactivation process according to the unsuccessful bearer information. There is no strict sequence relationship in time between this step and steps 802 or 803.

The MME 830 initiates a deactivation message to the UE 800. The UE 800 initiates a PDN connection establishment process to the MME 830 immediately according to the indication contained in the deactivation message, and the MME 830 reselects a PDN GW 850 for the UE 800. Alternatively, the UE 800 initiates a PDN connection establishment process as required by the service, and the MME 830 reselects a PDN GW 850 for the UE 800.

It should be noted that in the above exemplary embodiments, the way in which the destination base station or the core network node, e.g. the MME, obtains the information for access control is not limited to handover signaling, but it may make an access control determination through an OAM server or information pre-stored before the handover. Also, the base station (including the source base station and the destination base station) mentioned in the various embodiments may be a Home evolved Node B (HeNB) or eNB. In addition, although the above embodiments are all described with a System Architecture Evolution (SAE) system as an example, the methods provide by the present invention also apply to a Universal Mobile Telecommunication System (UMTS) system, where the base station is a Home Node B (HNB) or Node B, the MME corresponds to an General Packet Radio Service Supporting Node (SGSN) in the UMTS system, and the PDN GW corresponds to a GGSN in the UMTS system. Moreover, the various handover scenarios to which the methods provided by the above embodiments apply, are not limited to S1 handover, X2 handover, or the handover within the UMTS network.

Figure 9:
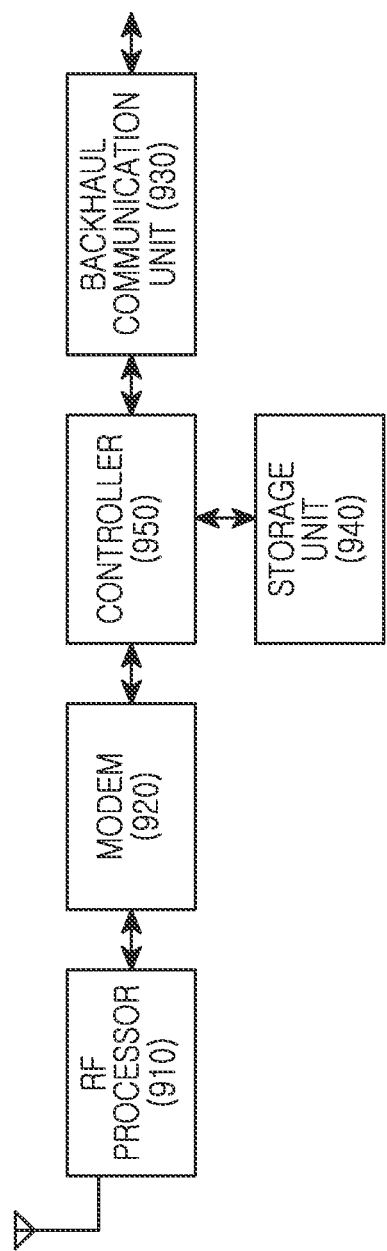
FIG. 9 is a block diagram of a base station in a communication system according to an exemplary embodiment of the present invention.

FIG. 9 is a block diagram of a base station in a communication system according to an exemplary embodiment of the present invention. The base station described in FIG. 9 may include a source base station and a destination base station.

Referring to FIG. 9, the base station includes a Radio Frequency (RF) processor 910, a modem 920, a backhaul communication unit 930, a storage unit 940, and a controller 950.

The RF processor 910 performs functions, such as signal band conversion and amplification, to transmit and receive signals over a radio channel. That is, the RF processor 910 up-converts a baseband signal output from the modem 920 into an RF signal and transmits the RF signal over an antenna. Also, the RF processor 910 down-converts the RF signal received over the antenna into the baseband signal. Although not illustrated, for example, the RF processor 910 may include an amplifier, a mixer, an oscillator, a Digital to Analog Converter (DAC), an Analog to Digital Converter (ADC) and the like.

The modem 920 converts the baseband signal and a bit string according to a physical layer standard of the system. For example, to transmit data, the modem 920 generates complex symbols by encoding and modulating a transmit bit string, maps the complex symbols to subcarriers, and constitutes Orthogonal Frequency-Division Multiplexing (OFDM) symbols by applying Inverse Fast Fourier Transform (IFFT) and inserting a Cyclic Prefix (CP). When receiving data, the modem 920 splits the baseband signal output from the RF processor 910 into OFDM symbols, restores the signals mapped to the subcarriers using Fast Fourier Transform (FFT), and restores the receive bit string by demodulating and decoding the signals.

The backhaul communication unit 930 provides an interface for the base station to communicate with other entities (i.e., other BSs, an MME, and the like). More specifically, the backhaul communication unit 930 converts the bit string transmitted by the base station into a physical signal, and converts the physical signal received at the base station into the bit string.

The storage unit 940 stores program codes and system information required for the operations of the BS. The storage unit 940 provides stored data to the controller 950 upon a request from the controller 950.

The controller 950 controls the functions of the BS. For example, the controller 950 generates a transmit packet and a message and provides the modem 920 with the transmit packet and the message. The controller 950 also processes a receive packet and a message from the modem 920. More particularly, according to an exemplary embodiment of the present invention, the controller 950 controls a function for supporting gateway node reselection, such as during the process that a UE hands over from a source base station to a destination base station.

For example, the controller 950 controls a function for supporting gateway node reselection, such as during the process that a UE hands over from a source base station to a destination base station as illustrated in FIG. 4 to FIG. 8. More particularly, the controller 950 of a source base station provides a destination base station via the backhaul communication unit 930 with information for access control determination. The controller 950 of the destination base station makes an access control determination according to the information provided by the source base station via the backhaul communication unit 930. Thereby, a UE or a network initiates a gateway reselection process according to the result of the access control determination.

Figure 10:
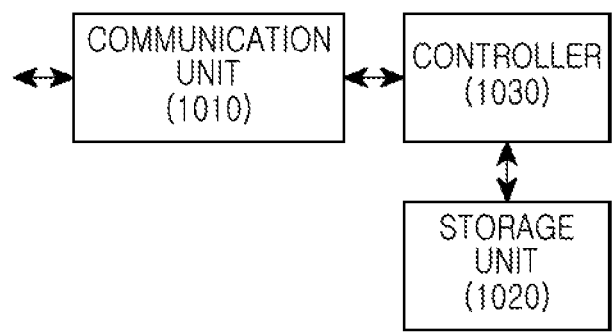
FIG. 10 is a block diagram of a Mobile Management Entity (MME) in a communication system according to an exemplary embodiment of the present invention.

FIG. 10 is a block diagram of an MME in a communication system according to an exemplary embodiment of the present invention.

Referring to FIG. 10, the MME includes a communication unit 1010, a storage unit 1020, and a controller 1030.

The communication unit 1010 provides an interface for an MME to communicate with other entities (i.e., a base station and on the like).

The storage unit 1020 stores program codes and system information required for the operations of the MME.

The controller 1030 controls the functions of the MME. For example, the controller 1030 manages a control signaling of at least one base station connected to the MME. More particularly, according to an exemplary embodiment of the present invention, the controller 1030 controls a function for supporting gateway node reselection for a UE. For example, the controller 1030 controls a function for supporting gateway node reselection for a UE as illustrated in FIG. 3 to FIG. 8.

As can be seen from the above description, the above described exemplary methods support the method of PDN GW or GGSN reselection, depending on different mobility management processes. In the case of user plane node reselection because the UE changes position or is switched to another base station, the PDN GW or GGSN reselection is implemented by optimizing the existing signaling processes. In the case of user plane node reselection because the operator updates the policies, the influence on the existing flows can be reduced and the PDN GW or GGSN reselection can be implemented rapidly.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for supporting gateway node selection during a process in which a User Equipment (UE) hands over from a source base station to a target base station, the method comprising:
   providing, in a handover request message sent by the source base station, the target base station with information required for a determination of whether to grant the UE access to the target base station;
   determining, by the target base station, access control according to the information provided by the source base station; and
   initiating, by the UE or a network, a gateway selection process for the UE when the result of the access control determination indicates that handover preparation has failed.

2. The method according to claim 1, wherein the information for the access control determination provided by the source base station includes information of a user plane gateway, and wherein the information of the user plane gateway node comprises at least one of an IP address and an identifier of a Packet Data Network Gateway (PDN GW).

3. The method according to claim 1, wherein the determining of the access control comprises
   when determining, by the target base station, that the handover fails, sending, by the target base station, a handover preparation failure message to the source base station.

4. The method according to claim 3, wherein the initiating of the gateway reselection process comprises:
   upon receiving the handover preparation failure message, requesting, by the source base station, a core network node to initiate a PDN connection releasing process;
   after the completion of the PDN connection releasing process, initiating, by the UE, a PDN connection establishment request to a Mobile Management Entity (MME); and
   upon receiving the PDN connection establishment request, reselecting, by the MME, a PDN GW for the UE according to subscription information of the UE and information of a currently accessed base station.

5. The method according to claim 4, wherein the requesting of the core network node to initiate a PDN connection releasing process comprises:
   according to the received handover preparation failure message, sending, by the source base station, a request message to the MME requesting the MME to trigger the PDN connection releasing process; and
   sending, by the MME, a PDN connection releasing request message to the UE.

6. The method according to claim 4, wherein the requesting of the core network node to initiate a PDN connection releasing process comprises:
   upon receiving the handover preparation failure message, sending, by the source base station, a Radio Resource Connection (RRC) releasing message to the UE; and
   upon receiving the RRC releasing message, instructing, by the UE, a Non-Access Stratum (NAS) layer to initiate the PDN connection releasing process.

7. The method according to claim 6, wherein the initiating of the PDN connection establishment request to the MME comprises:
   after the completion of the PDN connection releasing process, initiating, by the UE, a PDN connection establishment request to the MME as required by a service, or, after the completion of the PDN connection releasing process, initiating, by the UE, a PDN connection establishment request to the MME.

8. A system for supporting gateway node selection during a process in which a User Equipment (UE) hands over from a source base station to a target base station, the system comprising:
   a source base station for providing, in a handover request message, the target base station with information required for a determination of whether to grant the UE access to the target base station;
   a target base station for making an access control determination according to the information provided by the source base station; and a UE or a network for initiating a gateway selection process for the UE when the result of the access control determination indicates that handover preparation has failed.

9. The system according to claim 8, wherein the information for the access control determination provided by the source base station includes information of a user plane gateway, and wherein the information of the user plane gateway node comprises at least one of an IP address and an identifier of a Packet Data Network Gateway (PDN GW).

10. The system according to claim 8, wherein, when the target base station determines that the handover has failed, the target base station sends a handover preparation failure message to the source base station.

11. The system according to claim 10, further comprising:
a Mobile Management Entity (MME) for, upon receiving the PDN connection establishment request, reselecting a PDN GW for the UE according to subscription information of the UE and information of a currently accessed base station,
wherein the source base station, upon receiving the handover preparation failure message, requests a core network node to initiate a PDN connection releasing process, and
wherein the UE, after the completion of the PDN connection releasing process, initiates a PDN connection establishment request to an MME.

12. The system according to claim 11, wherein the source base station, according to the received handover preparation failure message, sends to the MME a request message requesting the MME to trigger the PDN connection releasing process, and
wherein the MME sends a PDN connection releasing request message to the UE.

13. The system according to claim 11, wherein the source base station, upon receiving the handover preparation failure message, sends a Radio Resource Connection (RRC) releasing message to the UE, and
wherein the UE, upon receiving the RRC releasing message, instructs a Non-Access Stratum (NAS) layer to initiate the PDN connection releasing process.

14. The system according to claim 13, wherein the UE, after the completion of the PDN connection releasing process, initiates a PDN connection establishment request to the MME as required by a service, or, after the completion of the PDN connection releasing process, the UE initiates a PDN connection establishment request to the MME.

* * * * *